Amos Ovaitt's Impt in Mouse Trap

116743 PATENTED JUL 4 1871

UNITED STATES PATENT OFFICE.

AMOS OVAITT, OF UNIONVILLE, CONNECTICUT.

IMPROVEMENT IN MOUSE-TRAPS.

Specification forming part of Letters Patent No. 116,743, dated July 4, 1871.

*To all whom it may concern:*

Be it known that I, AMOS OVAITT, of Unionville, in the county of Hartford and State of Connecticut, have invented a new Improvement in Mouse-Traps; and I do hereby declare the following, when taken in connection with the accompanying drawing and letters of reference marked thereon, to be a full, clear, and exact description of the same, and which said drawing constitutes part of this specification, and represents, in—

Figure 1:
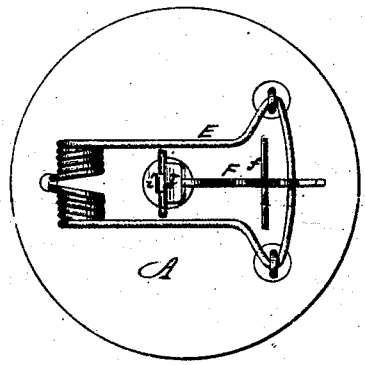
Figure 2:
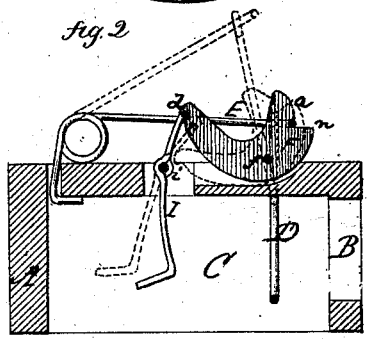

Figure 1 a top view, and in Fig. 2 a central section.

This invention relates to an improvement in that class of traps commonly known as "garrote traps;" and consists in the peculiar construction of the setting-lever combined with the bait-hook, whereby, by the depression of the yoke, the bait-hook is made to operate automatically.

A is the block upon which the trap is arranged; B, the opening through which the animal enters; and C, the baiting-chamber, constructed in the usual manner for this class of traps. D is the yoke, attached to a spring-bar, E, at the top of the trap, also in the usual manner. F is a lever pivoted to the block at $f$, constructed with a latch end, $a$, and with a shoulder, $d$, at the other end. I is the bait-hook, pivoted at $i$ and extending up so as to rest under the shoulder $d$ of the lever, as seen in Fig. 2.

To set the trap depress the spring-bar until it passes down over the latch $a$, pressing down upon the shoulder $n$ until the opposite end of the lever is raised sufficiently to allow the bait-hook to fall under the shoulder $d$, as seen in Fig. 2. This brings the latch over the spring-bar and holds it in position until the bait-hook is tripped, and when so tripped the spring-bar throws up the latch end of the lever and draws up the yoke, as denoted in broken lines, Fig. 2. The bait-hook I at the upper end is made of sufficient width, as seen in Fig. 1, so that, when the trap is sprung, it lies over the rear end of the lever, as denoted in broken lines, Fig. 2, and when the rear end of the lever is raised it throws the upper end of the bait-hook back, causing the bait-hook, when the lever is sufficiently raised, by its own gravitation to fall beneath the shoulder $d$. Thus the trap is set by simply depressing the spring-bar, without any manipulation of the bait-hook or lever.

I claim as my invention—

In combination with the yoke D and spring-bar E, the lever F and bait-hook I, constructed and arranged as herein described, so that by depressing the spring-bar onto the lever the trap is set.

AMOS OVAITT.

Witnesses:
G. H. ROOT,
E. E. POST.